United States Patent
Kloth

(10) Patent No.: US 6,549,961 B1
(45) Date of Patent: Apr. 15, 2003

(54) SEMAPHORE ACCESS IN A MULTIPROCESSOR SYSTEM

(75) Inventor: Axel K. Kloth, Milpitas, CA (US)

(73) Assignee: Infineon Technologies North America Corporation, San Jose, CA (US)

( * ) Notice: Subject to any disclaimer, the term of this patent is extended or adjusted under 35 U.S.C. 154(b) by 0 days.

(21) Appl. No.: 09/429,502

(22) Filed: Oct. 27, 1999

(51) Int. Cl.[7] .................................................. G06F 3/00
(52) U.S. Cl. ........................ 710/36; 710/20; 710/107; 712/32
(58) Field of Search ......................... 710/1, 8, 15, 36, 710/40, 41, 42, 57, 112, 129, 20, 23, 38, 39, 107; 709/200, 207, 213; 712/32

(56) References Cited

U.S. PATENT DOCUMENTS

| | | | | |
|---|---|---|---|---|
| 4,374,409 A | * | 2/1983 | Bienvenu et al. | 364/200 |
| 4,725,946 A | * | 2/1988 | Prange et al. | 364/200 |
| 4,965,718 A | * | 10/1990 | George et al. | 364/200 |
| 5,313,638 A | * | 5/1994 | Ogle et al. | 395/725 |
| 5,524,209 A | * | 6/1996 | Parker et al. | 714/36 |
| 5,951,662 A | * | 9/1999 | Tissot | 710/107 |
| 6,128,710 A | * | 10/2000 | Greenspan et al. | 711/152 |
| 6,170,025 B1 | * | 1/2001 | Drottar et al. | 710/48 |
| 6,272,580 B1 | * | 8/2001 | Stevens et al. | 710/116 |

* cited by examiner

Primary Examiner—Jeffrey Gaffin
Assistant Examiner—Rijue Mai
(74) Attorney, Agent, or Firm—Fish & Richardson P.C.

(57) ABSTRACT

Access control to protected resources in a multiprocessor system is implemented without additional use of the processor bus. A bridge interconnects each processor with shared resources. The bridge has a semaphore corresponding to each protected resource indicating if the corresponding resource is available. The bridge halts a processor requesting access to any resource having a corresponding semaphore indicating the requested resource is not available.

19 Claims, 3 Drawing Sheets

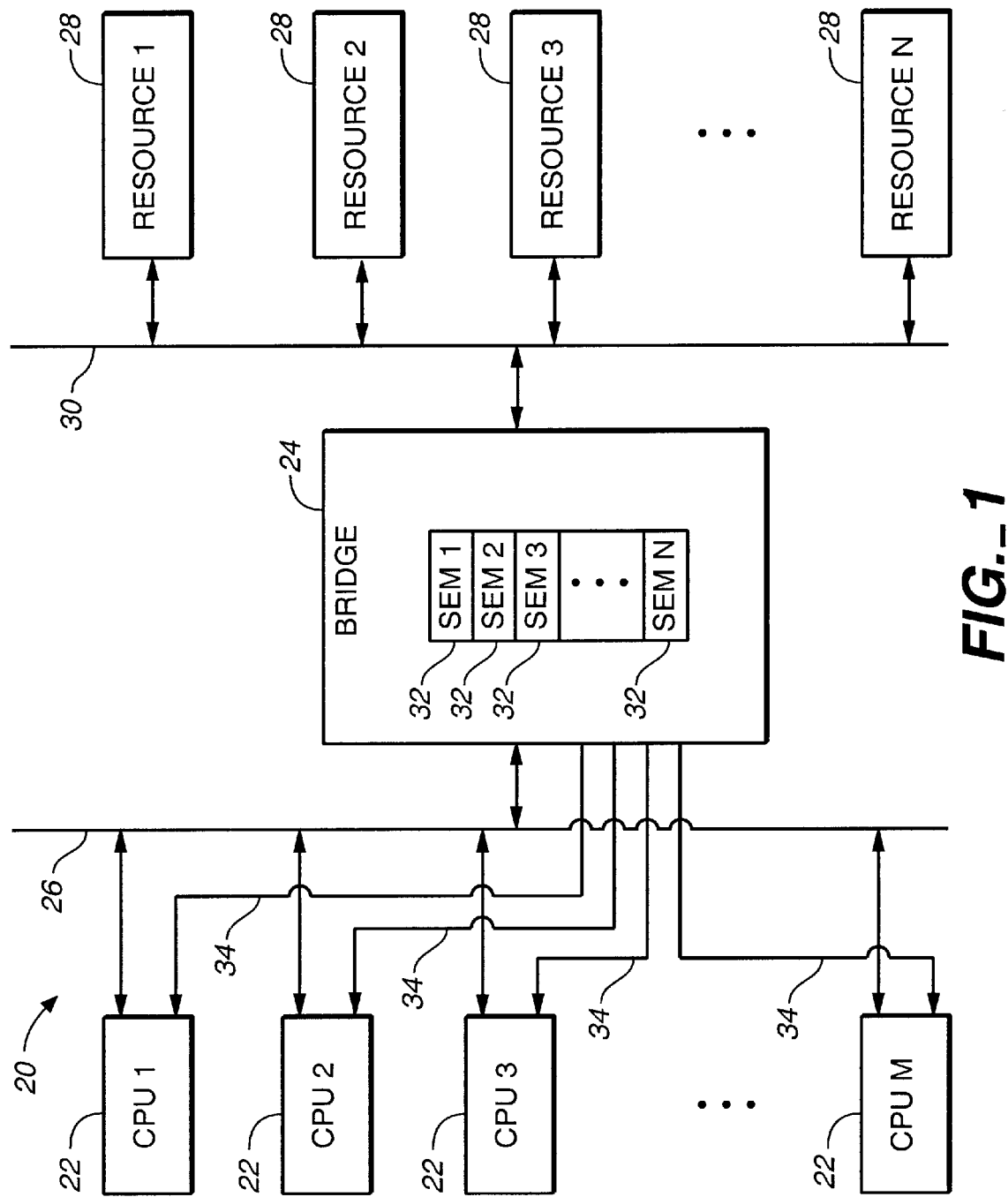
FIG._1

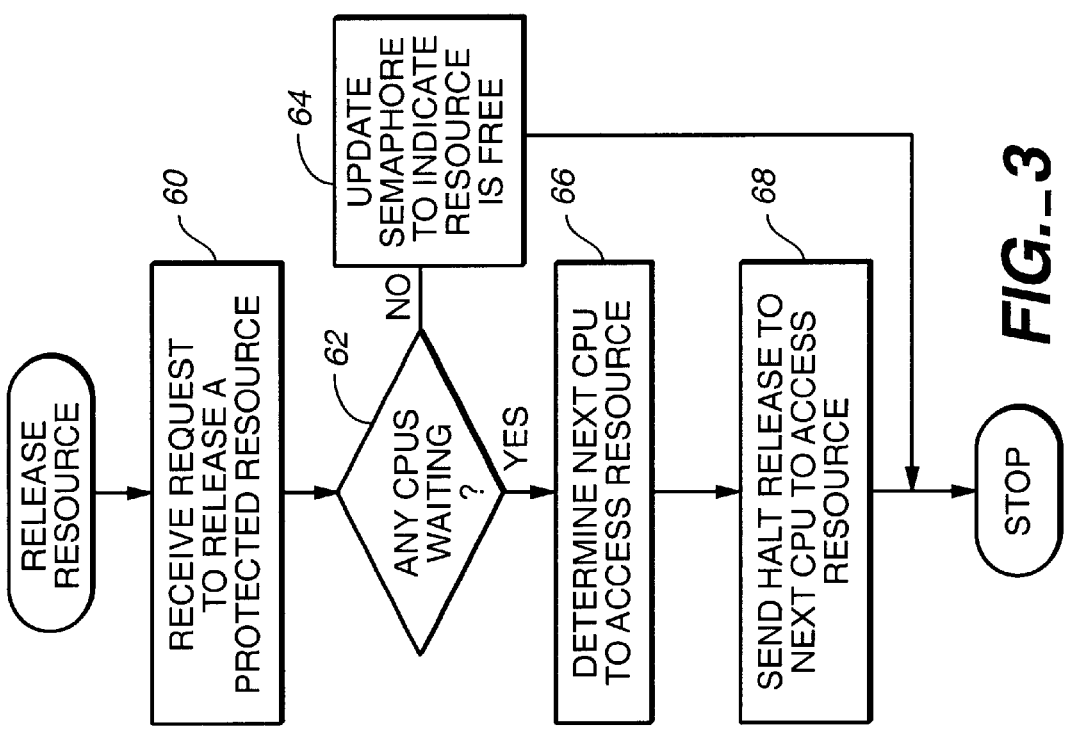
FIG._3
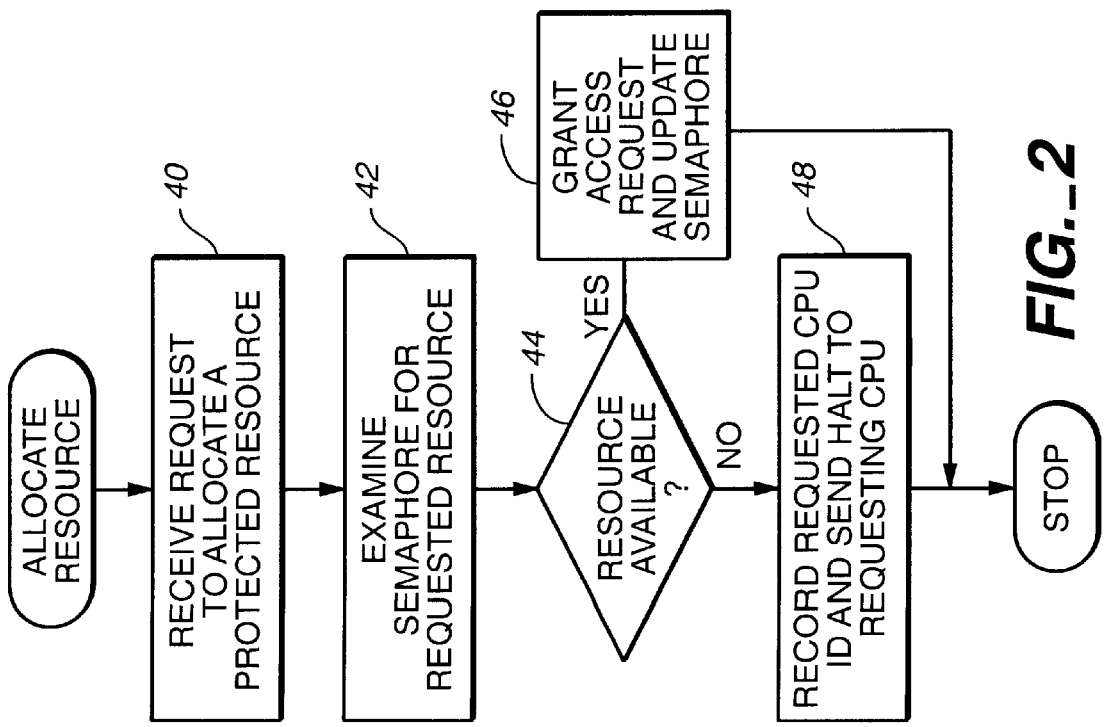
FIG._2

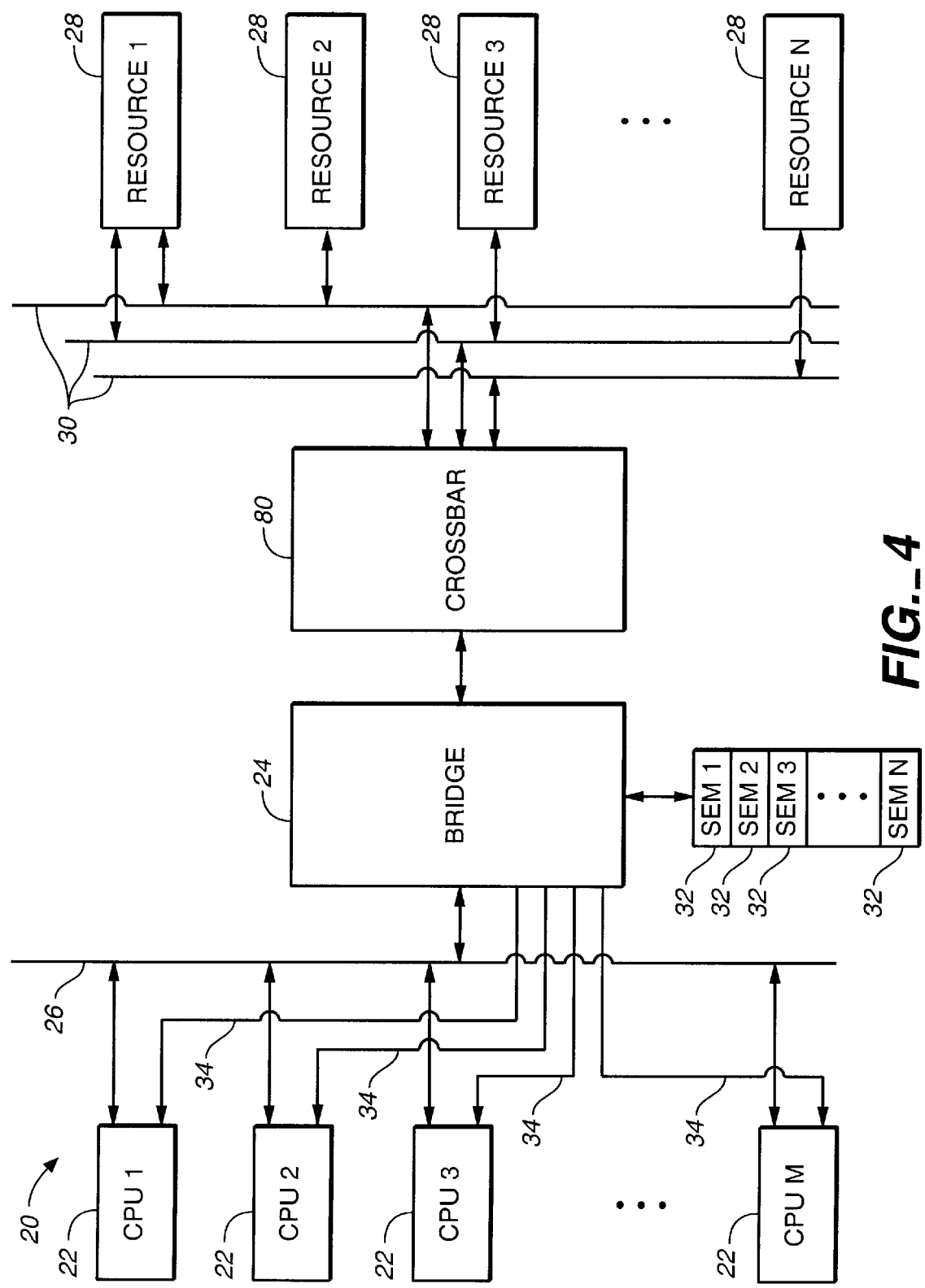
FIG._4

SEMAPHORE ACCESS IN A MULTIPROCESSOR SYSTEM

TECHNICAL FIELD

The present invention relates to determining access to protected resources in a multiprocessor system.

BACKGROUND ART

Multiprocessor systems use two or more processors to increase task execution speed and throughput. Each processor typically has local resources, such as cache memory, to which only that processor has access. Shared resources, such as memory, I/O devices, and the like, may be accessed by more than one processor. A typical multiprocessor architecture uses one or more bridges to interconnect processors and shared resources. Each bridge is connected to two or more processors through a processor bus. Shared resources are connected to the bridge through one or more resource buses.

In a multiprocessor system, a conflict results if more than one processor attempts to access the same resource at the same time. Conflicts are typically resolved through the use of semaphores. Each shared resource is assigned a semaphore. Before accessing the shared resource protected by a semaphore, the processor first checks the semaphore. If the semaphore indicates that the protected resource is available, the processor is granted access and the access is indicated by updating the semaphore. If the semaphore indicates the protected resource is not available, the processor is denied access.

Semaphore-based access control may be implemented in many different manners. A common technique is to locate semaphores in a central location such as at one of the processors or at the protected resource. A processor wishing to access the protected resource would check the semaphore for the protected resource through a processor bus interconnecting the requesting processor and the semaphore. If the processor is denied access, the processor executes a polling loop until the semaphore indicates that the requested resource is available. This creates two problems. First, the processor continues to execute instructions while waiting, wasting processor CPU cycles and generating heat. Second, processor bus cycles are wasted while the requesting processor checks the semaphore status. This reduces the effective bus bandwidth, potentially reducing the throughput of other processors.

Another technique is to store the value of each semaphore locally at each processor. Processors no longer utilize bus cycles in polling. However, processors still waste CPU cycles polling, generating heat without accomplishing any useful task. Also, either processor bus cycles must be wasted to update local semaphore copies or special hardware within each processor and communication busing must be used. A further problem is synchronizing the local semaphore values in each processor.

What is needed is to control access to protected resources in a multiprocessor system without wasting processor bus cycles or CPU instruction cycles and without requiring significant additional hardware.

DISCLOSURE OF INVENTION

It is an object of the present invention to control access to protected resources in a multiprocessor system.

It is another object of the present invention to control access to protected resources without requiring excessive processor bus cycles.

It is yet another object of the present invention to control access to protected resources without wasting CPU execution cycles.

It is still another object of the present invention to control access to protected resources without requiring excessive additional hardware.

In carrying out the above objects and other objects and features of the present invention, a multiprocessor system is provided. The multiprocessor system includes at least one protected resource. A plurality of processors generate requests to access the protected resources. A bridge interconnects each processor and protected resources. The bridge has a semaphore corresponding to each protected resource indicating if the corresponding resource is available. The bridge halts a processor requesting access to any resource having a corresponding semaphore indicating the requested resource is not available.

In an embodiment of the present invention, the bridge resumes execution of the halted processor when the semaphore corresponding to the requested resource indicates the requested resource is available.

In another embodiment of the present invention, the multiprocessor system further includes a processor bus interconnecting the processors and the bridge and a resource bus interconnecting the protected resources and the bridge.

In still another embodiment of the present invention, each resource accesses at least one of many resource buses. The multiprocessor system further includes a crossbar switch for routing access requests to the requested resource when the requested resource is available.

In yet another embodiment of the present invention, the bridge is a northbridge. The northbridge may include a crossbar switch.

A method of controlling access to protected resources in a multiprocessor system is also provided. A request is received from a processor to access a protected resource. The state of a semaphore corresponding to the protected resource is examined to indicate the availability of the protected resource. If the semaphore indicates that the resource is available, the requesting processor is granted access to the protected resource. If the semaphore indicates that the resource is unavailable, the requesting processor is halted.

In an embodiment, the method further includes receiving a resource release from a processor granted access to the protected resource. If a processor is halted waiting for the released resource, execution is resumed by the halted processor.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a block diagram of a multiprocessor system according to an embodiment of the present invention;

FIG. 2 is a flow diagram illustrating resource allocation in a multiprocessor system according to an embodiment of the present invention;

FIG. 3 is a flow diagram illustrating resource releasing in a multiprocessor system according to an embodiment of the present invention; and FIG. 4 is a block diagram of a multiprocessor system including a crossbar switch according to an embodiment of the present invention.

BEST MODE FOR CARRYING OUT THE INVENTION

Referring to FIG. 1, a block diagram of a multiprocessor system according to an embodiment of the present invention is shown. A multiprocessor system, shown generally by 20, includes at least two processors 22, shown as CPUs in FIG. 1. Each processor 22 is connected to bridge 24 by processor bus 26. Processor bus 26 carries data signals, address signals, control signals, and the like. Multiprocessor system 20 also includes at least one resource 28. Each resource 28 is connected to bridge 24 through resource bus 30. Resource bus 30 also carries data signals, address signals, control signals, and the like. Resource bus 30 may be of various bus types including PCI, IDE, AGP, memory, and the like.

Bridge 24 accesses one semaphore 32, shown as SEM in FIG. 1, for each protected resource 28. Each semaphore 32 indicates whether protected resource 28 is available to processor 22 requesting access. Each semaphore 32 may be binary semaphore, count semaphore, or the like. Each processor 22 receives halt signal 34 from bridge 24. Halt signal 34 halts processor 22 when requested resource 28 is not available.

Bridge 24 may include a northbridge. A northbridge typically contains major bus control circuitry, such as memory controllers, cache controllers, PCI controllers, and the like. For example, the northbridge may be a 440BX, or 82443BX HOST BRIDGE/CONTROLLER, from Intel Corporation. The 440BX can connect to two PENTIUM® II processors 22 using processor bus 26. Semaphores 32 may be implemented as registers within the 440BX or as a memory or I/O block external to the 440BX. Semaphores 32 can be addressed as contiguous or noncontiguous memory or I/O locations. Instructions implementing read-modify-write or locked cycle operations are used to access semaphores 32. The 440BX has the ability to monitor memory or I/O activity by "snooping" on the address bus. The 440BX may be programmed so that, when an access is to a locked semaphore indicating that the corresponding protected resource 28 is not available, the 440BX generates a HLT (processor halt) or NMI (non-maskable interrupt) signal to the requesting processor 22.

FIGS. 2 and 3 show flow diagrams illustrating operation of embodiments of the present invention. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart form for ease of illustration.

Referring now to FIG. 2, a flow diagram illustrating resource allocation in a multiprocessor system according to an embodiment of the present invention is shown. A request to allocate a protected resource is received in block 40. Bridge 24 receives an access request from processor 22. Typically, protected resource 28 to which access is requested is specified within the address of a data access request. The semaphore for the requested resource is examined in block 42. Bridge 24 examines a portion of the data access address sent by processor 22 to determine to which protected resource 28 the access request is intended. Bridge 24 next examines semaphore 32 corresponding to requested resource 28 to determine if requested resource 28 is available in block 44. If requested resource 28 is available, access is granted to processor 22, and semaphore 32 corresponding to protected resource 28 is updated in block 46. If requested resource 28 is not available, the identity of requesting processor 22 is recorded and halt signal 34 to requesting processor 22 is asserted in block 48.

Requesting processor 22 may interpret halt signal 34 in a variety of ways. In one embodiment of the present invention, processor 22 suspends all execution while halt signal 34 is asserted. In another embodiment of the present invention, halt signal 34 generates an interrupt within processor 22. This interrupt may trigger a task switch, starting another task which may not require unavailable resource 28. In still another embodiment of the present invention, halt signal 34 prevents processor 22 from accessing processor bus 26, but does not prevent processor 22 from continuing execution using local resources. If processor 22 cannot proceed, execution may be suspended until halt signal 34 becomes unasserted.

Referring now to FIG. 3, a flow diagram illustrating resource releasing in a multiprocessor system according to an embodiment of the present invention is shown. Processor 22, granted access to protected resource 28, eventually completes access and releases protected resource 28. Bridge 24 receives a request to release protected resource 28 from processor 22 in block 60. A check is made to determine if any processors 22 are waiting to access release resource 28 in block 62. If not, semaphore 32 corresponding to released resource 28 is updated to indicate that released resource 28 is free. Otherwise, the next processor 22 to access released resource 28 is determined in block 66. This determination may be based on first come-first served, processor 22 priority, round robin, and the like. Once the next processor 22 is determined, halt signal 34 is deasserted to release the next processor 22 to access protected resource 28 in block 68.

Referring now to FIG. 4, a block diagram of a multiprocessor system including a crossbar switch according to an embodiment of the present invention is shown. Protected resources 28 may be interconnected to the remaining elements of multiprocessor system 20 through a plurality of resource buses 30. These resource buses 30 may be of the same or different types. Multiprocessor system 20 may include crossbar switch 80 to route access requests from processors 22 to requested resources 28. Crossbar switch 80 may be built into bridge 24 or may be a stand alone component of multiprocessor system 20.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A multiprocessor system comprising:
   at least one protected resource;
   a plurality of processors, each processor operative to generate requests to access the at least one protected resource; and
   a bridge in communication with each processor through a first bus and the at least one protected resource through a second bus, the bridge having a semaphore corresponding to each of the at least one protected resource indicating if the corresponding resource is available, the bridge operative to halt a processor requesting access to any resource having a corresponding semaphore indicating the requested resource is not available.

2. A multiprocessor system as in claim 1 wherein the bridge is further operative to resume execution by the halted processor when the semaphore corresponding to the requested resource indicates the requested resource is available.

3. A multiprocessor system as in claim 1 wherein the first bus comprises a processor bus interconnecting the plurality of processors and the bridge and the second bus comprises a resource bus interconnecting the at least one protected resource and the bridge.

4. A multiprocessor system as in claim 1 wherein each resource accesses at least one of a plurality of resource buses, the system further comprising a crossbar switch operative to route access requests to the requested resource when the requested resource is available.

5. A multiprocessor system as in claim 1 wherein the bridge is a northbridge.

6. A multiprocessor system as in claim 5 wherein the northbridge comprises a crossbar switch operative to route an access request to the requested resource when the requested resource is available.

7. A multiprocessor system comprising:
   at least one protected resource;
   a plurality of processors, each processor operative to generate requests to access the at least one protected resource; and
   a bridge in communication with each processor and the at least one protected resource, the bridge having a semaphore corresponding to each of the at least one protected resource indicating if the corresponding resource is available, the bridge operative to halt a processor requesting access to any resource having a corresponding semaphore indicating the requested resource is not available
      wherein the at least one protected resource comprises a plurality of memory arrays, access to any element of a memory array determined by the semaphore corresponding to the memory array.

8. A method of controlling access to at least one protected resource in a multiprocessor system comprising:
   receiving a request from a processor, in a bridge, to access a protected resource;
   examining the state of a semaphore in the bridge corresponding to the protected resource, the semaphore state indicating availability of the protected resource;
   if the semaphore indicates that the resource is available, granting the requesting processor access to the protected resource; and
   if the semaphore indicates that the resource is unavailable, halting the requesting processor
      wherein a first bus interconnects the bridge and the processor and a second bus interconnects the bridge and the protected resource.

9. A method of controlling access to at least one protected resource as in claim 8 wherein the second bus comprises a resource bus and each resource is accessed through at least one of a plurality of resource buses, the method further comprising:
   determining upon which resource bus the resource will be accessed if the resource is available; and
   setting a crossbar switch to connect the requesting processor to the determined resource bus.

10. A method of controlling access to at least one protected resource in a multiprocessor system comprising:
    receiving a request from a processor to access a protected resource;
    examining the state of a semaphore corresponding to the protected resource, the semaphore state indicating availability of the protected resource;
    if the semaphore indicates that the resource is available, granting the requesting processor access to the protected resource;
    if the semaphore indicates that the resource is unavailable, halting the requesting processor;
    receiving a resource release from a processor granted access to the protected resource;
    determining if a processor is halted waiting for the released resource; and
    if a processor is halted, resuming execution by the halted processor.

11. A bridge for interconnecting a plurality of processors to at least one protected resource, the bridge comprising a semaphore corresponding to each of the at least one protected resource indicating if the corresponding resource is available, the bridge operative to halt a processor requesting access to any resource having a corresponding semaphore indicating the requested resource is not available and the bridge being interconnected to the plurality of processors by at least one processor bus and to the at least one protected resource by at least one resource bus.

12. A bridge as in claim 11 wherein the bridge is further operative to resume execution by the halted processor when the semaphore corresponding to the requested resource indicates the requested resource is available.

13. A bridge as in claim 11 wherein each resource accesses at least one of a plurality of resource buses, the bridge further comprising a crossbar switch operative to route access requests to the requested resource when the requested resource is available.

14. A bridge as in claim 11 wherein the bridge is a northbridge.

15. A bridge for interconnecting a plurality of processors to at least one protected resource, the bridge comprising a semaphore corresponding to each of the at least one protected resource indicating if the corresponding resource is available, the bridge operative to halt a processor requesting access to any resource having a corresponding semaphore indicating the requested resource is not available
    wherein the at least one protected resource comprises a plurality of memory arrays, access to any element of a memory array determined by the semaphore corresponding to the memory array.

16. A multiprocessor system comprising:
    at least one protected resource;
    a plurality of processors, each processor operative to generate requests to access the at least one protected resource; and
    a bridge in communication with each processor through a first bus and the at least one protected resource through a second bus, the bridge having a semaphore corresponding to each of the at least one protected resource indicating if the corresponding resource is available, the bridge operative to transmit a signal to halt a processor requesting access to any resource having a corresponding semaphore indicating the requested resource is not available.

17. A multiprocessor system as in claim 16 wherein the bridge is further operative to resume execution by the halted processor when the semaphore corresponding to the requested resource indicates the requested resource is available.

18. A method of controlling access to at least one protected resource in a multiprocessor system comprising:

receiving a request from a processor to access a protected resource;

examining the state of a semaphore corresponding to the protected resource, the semaphore state indicating availability of the protected resource;

if the semaphore indicates that the resource is available, granting the requesting processor access to the protected resource; and if the semaphore indicates that the resource is unavailable, transmitting a signal to halt the requesting processor.

19. A method of controlling access to at least one protected resource as in claim 18 further comprising:

receiving a resource release from a processor granted access to the protected resource;

determining if a processor is halted waiting for the released resource; and if a processor is halted, resuming execution by the halted processor.

* * * * *